United States Patent Office 3,435,039
Patented Mar. 25, 1969

3,435,039
QUATERNARY AMMONIUM SALTS OF ALCOHOL ETHER SULFATES
Reginald L. Wakeman, Philadelphia, Pa., and Joseph F. Coates, Washington, D.C., assignors to Millmaster Onyx Corporation, Jersey City, N.J., a corporation of New York
No Drawing. Continuation-in-part of application Ser. No. 315,708, Oct. 11, 1963. This application Aug. 31, 1966, Ser. No. 576,232
Int. Cl. C07c *141/02, 95/00*; A01n *9/20*
U.S. Cl. 260—286     5 Claims

ABSTRACT OF THE DISCLOSURE

Quaternary ammonium salts of alcohol ether sulfates having germicidal properties and low solubility are described.

---

This invention relates to the preparation of relatively water-insoluble, microbiocidally active compounds obtained by the reaction of water-soluble quaternary ammonium compounds with water-soluble alcohol ether sulfates.

This is a continuation-in-part of co-pending application Ser. No. 315,708, filed Oct. 11, 1963, now abandoned.

The compounds of this invention correspond to the following formula:

$$RCH_2CH_2O(\overset{R_1}{\underset{|}{C}}HCH_2O)_nSO_3^-Z^+$$

wherein R is an aliphatic or homocyclic hydrocarbon radical containing from about 8 to about 20 carbon atoms, $R_1$ represents hydrogen or low molecular alkyl radical and $n$ may be an integer from 1 to 20. The designation $Z^+$ may be any suitable microbiocidally active quaternary ammonium cation.

These compounds can be prepared by mixing an aqueous solution of a suitable water-soluble alcohol ether sulfate or alkyl phenol ether sulfate with an aqueous solution of a quaternary ammonium salt having microbiocidally active properties. The two solutions are thoroughly mixed and then are allowed to stand until they separate into two distinct layers. The upper layer will normally contain the compound of the present invention.

Layer separation is conveniently effected by conducting the reaction in a separatory funnel and drawing off the desired layer. The product usually contains some water which can be removed by distillation or drying in a vacuum oven. The water-containing product layer can, however, be used directly in any process where the entrapped water would not be deleterious.

Alcohol ether sulfates are commercially available as solids or in aqueous solution. They are commonly used as ingredients in shampoos and other cosmetic formulations.

Any quaternary ammonium salt having microbiocidally active properties may be used for the purposes of this invention. This embraces those compounds having in the molecule at least one alkyl radical possessing from 8 to 18 carbon atoms. Such compounds are well known to those skilled in the art. One group corresponds to the formula:

$$\begin{array}{c} R_3 \\ | \\ R-N^+\bar{X} \\ / \phantom{N} \backslash \\ R_2 \phantom{N^+} R_2 \end{array}$$

wherein X is a halogen atom, such as bromine or chlorine, R is a benzyl radical or lower alkyl radical, $R_1$ and $R_2$ are each lower alkyl radicals and $R_3$ is alkyl from about 8 to about 18 carbon atoms. Typical examples are alkyl dimethyl benzyl ammonium chloride, alkyl dimethyl (dimethyl benzyl) ammonium chloride, alkyl dimethyl (ethyl benzyl) ammonium chloride, alkyl benzyl trimethyl ammonium chloride, alkyl dimethyl dichlor benzyl ammonium chloride, cetyl dimethyl ethyl ammonium bromide, cetyl trimethyl ethyl ammonium bromide, cetyl trimethyl ammonium bromide and oleyl dimethyl ethyl ammonium bromide.

Other quaternary compounds useful in this invention correspond to the formula:

$$\begin{array}{c} R_4-N^+\bar{X} \\ | \\ R_5 \end{array}$$

wherein X is a halogen atom, such as bromide or chloride, $R_4$ together with N forms a pyridinium or isoquinolinium radical and $R_5$ is alkyl having from about 8 to about 18 carbon atoms. Cetyl pyridinium chloride, lauryl pyridinium chloride and alkyl isoquinolinium bromide are illustrative of this group.

A third group corresponds to the formula:

$$R_9(OCH_2CH_2)\overset{R_7 \phantom{/} R_8}{\underset{\underset{R_6}{|}}{N^+\bar{X}}}$$

wherein X is a halogen atom, such as bromide or chloride, $R_6$ is a benzyl radical, $R_7$ and $R_8$ are each lower alkyl radicals and $R_9$ is an alkyl phenyl radical. Members of this group include isooctylethoxy ethyl benzyl dimethyl ammonium chloride and the like.

Other types of quaternary ammonium compounds which may be used for this invention are:

Alkenyl ($C_{12}$–$C_{20}$) dimethyl ethyl ammonium-halide,
Alkyl benzyl hydroxy ethyl imidazolinium-halide,
N-ethyl-N "soya" morpholinium-halide, and
N-alkyl tolylmethyl dimethyl ammonium-halide.

In general, it is preferred to use the quaternary ammonium compounds which have a phenol coefficient of at least 100 with respect to both *Staphylococcus aureus* and *Salmonella typhosa* at 20° C. when determined by the standard method given in the "Official Methods of Analysis of the Association of Official Agricultural Chemists," 9th Edition (1960), page 63 et seq.

It is surprising that the compounds of this invention exhibit high germicidal activity despite their relative insolubility in water. Because of this unusual combination of physical and microbiological properties, they can be used to impart laundry-resistant antimicrobial characteristics to textiles. They can also be used as the active agent in antimildew finishes for textiles which are resistant to leaching with water.

Although the compounds are water-insoluble, they are compatible with various organic solvents, plasticizers and high molecular weight compounds. Consequently, they may be incorporated as antimicrobial agents in synthetic resins and plastic. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents.

It will be understood that the properties of the products described herein will vary to some extent, depending upon the nature of the quaternary ammonium compound used in their preparation.

The chemical, physical and biological properties of the products of our invention make them especially appropriate for the following applications when accompanied by the appropriate vehicle, binders, medium or substrate:

(1) Mildewproofing fabric, canvas, ropes, textiles, awnings, sails, tenting and other woven and non-woven reticulated materials.

(2) Paint mildewstats.
(3) Jet plane fuel additive to control growth of microorganisms.
(4) Odor preservative agents for clothes and shoes.
(5) Mildew retardant and ordor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plastic, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application to film, waxes and cloth to preserve cheese, meats, vegetables and other food products.
(18) Algeal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.

The biological activity of our compounds was evaluated for biological stasis by the Standard Tube Dilution Test, the technique for which is common knowledge to those skilled in the art. A Difco Bacto CSMA Broth #0826 was used in the study. This test is used to determine the lowest concentration of biologically active compounds which will inhibit the growth of the organism in question. For a wide range of applications, the inhibition of growth rather than outright kill is satisfactory.

Briefly put, the Tube Dilution Test consists in putting 9 cc. of the CSMA Broth in a test tube which is then sterilized in an autoclave. One cc. solution of the biologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. They are, however, incubated for fourteen days at a temperature suitable for optimum growth.

The invention is illustrated by, but not restricted to, the following examples.

Example 1

In a four liter separatory funnel were placed 1000 grams of a 10% solution of sodium lauryl ether sulfate containing an average of four ethylene oxide groups and 820 grams of a 10% solution of alkyl dimethyl benzyl ammonium chloride (BTC–824, Onyx Chemical Corp.; alkyl distribution $C_{14}$ 60%, $C_{16}$ 30%, $C_{12}$ 5%, $C_{18}$ 5%). The funnel was well shaken and then 170 ml. of benzene were added to facilitate layer separation. The product layer was separated and the benzene evaporated on a steam bath. The product was then dried in a vacuum oven to give 164 grams (98% yield) of a white paste.

Example 2

In a two liter separatory funnel were placed 600 grams of a 10% solution of sodium lauryl ether sulfate identical to that used in Example 1 and 480 grams of a 10% solution of alkyl dimethyl ethyl benzyl ammonium chloride (BTC–471, Onyx Chemical Corp.; alkyl distribution $C_{12}$ 50%, $C_{14}$ 30%, $C_{16}$ 17%, $C_{18}$ 3%). The funnel was well shaken and then 120 ml. of benzene were added to facilitate layer separation. The product layer was separated and the benzene evaporated on a steam bath. The product ws then dried in a vacuum oven to give 94 grams (92% yield) of a white paste.

Example 3

In a two liter separatory funnel were placed 800 grams of a 10% solution of sodium lauryl ether sulfate identical to that used in Example 1 and 630 grams of a 10% solution of lauryl isoquinolinium bromide (Isothan Q–75, Onyx Chemical Corp.). The funnel was well shaken and 140 ml. of benzene were added to aid in layer separation. The product layer was separated and the benzene evaporated on a steam bath. The product was then dried in a vacuum oven to give 127 grams (97% yield) of a red paste.

Example 4

In a two liter separatory funnel were placed 600 grams of a 10% solution of sodium lauryl ether sulfate identical to that used in Example 1 and 530 grams of a 10% solution of alkyl dimethyl menaphthyl ammonium chloride (BTC-1100, Onyx Chemical Corp.; alkyl distribution $C_{12}$ 98%, $C_{14}$ 2%) in 80:20 water-isopropanol. The funnel was well shaken and 100 ml. of benzene were added to aid in layer separation. The product layer was heated on a steam bath to remove benzene and alcohol and then dried in a vacuum oven. One hundred and five grams (95% yield) of a white paste were obtained.

Instead of the sodium lauryl ether sulfate of Examples 1 and 4, we may use, for example, sulfated ethylene oxide adducts of lauryl alcohol, myristyl alcohol, cetyl alcohol, oleyl alcohol, isooctyl phenol, nonyl phenol and the like containing from 1 to 10 moles of ethylene oxide per mole of alcohol or alkyl phenol. We may also employ corresponding derivatives of higher aliphatic branched chain alcohols such, for example, as tridecyl alcohol.

Example 5

The products from Examples 1–3 were tested in the Standard Tube Dilution Test described above against *Staphylococcus aureus* (S.a.), *Salmonella typhosa* (S.t.) and *Aspergillus niger* (A.n.). Results of these tests are shown in Table I.

TABLE I

| Sodium lauryl ether sulfate reaction product with— | Reciprocal of static dilution of product vs.— | | |
|---|---|---|---|
| | S.a. | S.t. | A.n. |
| Alkyl dimethyl ethyl benzyl ammonium chloride | $10^6$ | $10^5$ | $10^4$ |
| Alkyl dimethyl benzyl ammonium chloride | $10^5$ | $10^5$ | $10^4$ |
| Lauryl isoquinolinium bromide | $10^6$ | $10^4$ | $10^5$ |

Example 6

A stock shampoo formulation was prepared as follows:

|  | Percent |
|---|---|
| Triethanolamine salt of lauryl sulfate | 30 |
| Lauric diethanolamide | 8 |
| Ethoxylated lanolin | 2 |
| Water | 60 |

A second solution was prepared consisting of 20% by weight of the product of Example 1 in isopropanol.

This isopropanol solution was mixed with the stock shampoo formulation to give a finished product containing 0.15% weight percent of product of Example 1. The finished product was active against *Pityrosporum ovale* in vitro and effective for the control of dandruff.

Example 7

A 25% by weight solution of each of the compounds of Examples 1–3 was prepared in ethylene glycol monobutyl ether. Four parts of each of these solutions were added to 96 parts of a latex acrylic type paint and well mixed. Each of the emulsions thus prepared was inoculated with a culture of *Pullularia pullulans* and incubated at 25° C. and 90% relative humidity for three weeks. At the end of this time, no fungus growth was visible in the latex.

Example 8

A 10% stock solution of the sodium salt of a sulfated ethoxylated nonyl phenol (Neutronyx S–30; Onyx Chemical Corp.) was prepared. Into each of three separatory funnels was placed 522 grams of this solution. To the first was added 380 grams of a 10% solution of alkyl dimethyl benzyl ammonium chloride identical to that used in Example 1. The product was worked up as in Example 1 to give a white paste in 92% yield. To the second funnel was added 388 grams of a 10% solution of alkyl dimethyl ethyl benzyl ammonium chloride identical to that used in Example 2. The product was worked up as in Example 2 to give a cream colored paste in 94% yield. To the third funnel was added 400 grams of a 10% solution of lauryl isoquinolinium bromide identical to that used in Example 3. The product was worked up as in Example 3 to give a red-brown paste in 97% yield.

Each of these compounds was found to retard mildew in freshly laundered cotton sheeting when added to the final rinse in the washing machine.

Example 9

Commercial tridecyl alcohol prepared by the oxo process was ethoxylated with an average of two moles of ethylene oxide and sulfated according to procedures described in "Higher Oxo Alcohols" by L. F. Hatch, 1957, Enjay Co., Inc. A 10% stock solution of the sodium salt of this sulfated ethoxylated alcohol was prepared. This solution was divided into three portions. The first portion was treated with a chemically equivalent quantity of a 10% solution of alkyl dimethyl benzyl ammonium chloride identical to that used in Example 1. The product was worked up as in Example 1 to give a white paste in 87% yield. The second portion was treated with a chemically equivalent quantity of a 10% solution of alkyl dimethyl ethyl benzyl ammonium chloride identical to that used in Example 2. The product was worked up as in Example 2 to give a yellow paste in 90% yield. The third portion was treated with a chemically equivalent quantity of a 10% solution of lauryl isoquinolinium bromide identical to that used in Example 3. The product was worked up as in Example 3 to give a red paste in 95% yield.

Example 10

A 10% stock solution of the sodium salt of a sulfated diethoxylated cetyl alcohol was prepared. This solution was divided into three portions and these portions treated as described in Example 9. The product from alkyl dimethyl benzyl ammonium chloride was a tan paste in 94% yield. The product from alkyl dimethyl ethyl benzyl ammonium chloride was a tan paste in 92% yield. The product from lauryl isoquinolinium bromide was a red-brown paste in 96% yield.

In general, the products of this invention are particularly useful in the control of plant diseases and plant pests. They exhibit little or not phytotoxicity when dipped or sprayed onto plant foliage in the form of 0.1% active solutions or dispersions. Thus, for example, there is no phytotoxicity observed by application of such concentrations of the products of Examples 1 through 4 to Wood's Prolific lima beans, whereas such application affords marked control of Mexican bean beetles feeding on the foliage.

In vitro tests of the product of Example 1 showed this material to be an active biocide versus *Ceratocystis ulmi* at concentrations as low as 100 parts per million. Likewise, the product of Example 3 showed active biocide properties against *Ceratocystis ulmi* at a concentration of 1000 parts per million.

Obviously, many modifications and variations of the present invention are possible in the light of the above teachings. It is, therefore, to be understood that, within the scope of the appended claims, the invention may be practiced otherwise than as specifically described.

The invention claimed is:

1. A compound having the structure:

wherein R is selected from the group consisting of aliphatic and homocyclic hydrocarbons having 8 to 20 carbon atoms, $R_1$ is selected from the group consisting of hydrogen and lower alkyl, $n$ is an integer from 1 to 20, and Z has the structure:

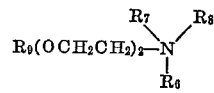

wherein $R_6$ is benzyl, $R_7$ and $R_8$ are each lower alkyl, and $R_9$ is alkyl phenyl.

2. A quaternary ammonium compound wherein the cation is alkyl dimethyl benzyl ammonium in which the alkyl group has 8 to 18 carbon atoms, and the anion is lauryl ether sulfate.

3. A quaternary ammonium compound wherein the cation is alkyl dimethyl ethyl benzyl ammonium in which the alkyl group has 8 to 18 carbon atoms, and the anion is lauryl ether sulfate.

4. A quaternary ammonium compound wherein the cation is lauryl isoquinolinium in which the alkyl group has 8 to 18 carbon atoms, and the anion is lauryl ether sulfate.

5. A quaternary ammonium compound wherein the cation is dodecyl dimethyl menaphthyl ammonium, and the anion is lauryl ether sulfate.

References Cited

UNITED STATES PATENTS

| 2,945,037 | 7/1960 | Druey et al. | 260—250 |
| 3,070,600 | 12/1962 | Rudner | 260—247.2 |
| 3,274,199 | 9/1966 | Wakeman et al. | 260—286 |
| 2,700,683 | 1/1955 | Tesoro et al. | 260—567.6 |

OTHER REFERENCES

Lawrence, "Surface Active Quaternary Ammonium Germicides," Academic Press, 1950, pages 8 and 127.

ALEX MAZEL, *Primary Examiner.*

D. G. DAUS, *Assistant Examiner.*

U.S. Cl. X.R.

252—8.55, 8.57, 51, 106; 260—584, 309.6, 247.1, 999, 513, 501.15, 567.5, 294.8, 326.82; 8—116.2, 128; 99—161, 222; 106—3, 15